United States Patent [19]
Yamazaki

[11] Patent Number: 5,858,462
[45] Date of Patent: Jan. 12, 1999

[54] POROUS METAL-OXIDE THIN FILM AND METHOD OF FORMING SAME ON GLASS SUBSTRATE

[75] Inventor: Seiji Yamazaki, Matsusaka, Japan

[73] Assignee: Central Glass Company, Limited, Yamaguchi, Japan

[21] Appl. No.: 676,289
[22] PCT Filed: Aug. 14, 1995
[86] PCT No.: PCT/US95/11512
  § 371 Date: Jul. 18, 1996
  § 102(e) Date: Jul. 18, 1996
[87] PCT Pub. No.: WO97/06896
  PCT Pub. Date: Feb. 27, 1997
[51] Int. Cl.⁶ ........................................ B05D 3/02
[52] U.S. Cl. ................. 427/226; 427/380; 427/389.7
[58] Field of Search ................... 427/226, 389.7, 427/380

[56] References Cited

U.S. PATENT DOCUMENTS 5,394,269 2/1995 Takamatsu .............................. 359/580
5,403,368 4/1995 Takahashi et al. ....................... 65/17.2
5,599,579 2/1997 Iwasaki .................................... 427/226

*Primary Examiner*—Janyce Bell
*Attorney, Agent, or Firm*—Evenson, McKeown, Edwards & Lenahan P.L.L.C.

[57] ABSTRACT

The invention relates to a porous metal-oxide film formed on a glass substrate by the sol-gel process. The film is prepared by a method comprising the steps of: (a) preparing a coating solution by mixing a metal alkoxide(s) and/or a metal acetylacetonate(s), a first solvent, water, an acid and an organic polymer; (b) applying the coating solution to the glass substrate; (c) drying a gel film formed thereon at a first temperature not higher than 100° C.; (d) contacting the gel film with a second solvent which is one of an acid solution and a mixed solution of alcohol and water; and (e) heating the gel film at a second temperature so as to transform the gel film into the porous metal-oxide film. The porous metal-oxide film's surface is minutely rough and has a fine features pattern of three-dimensional micro-porous structure.

7 Claims, 1 Drawing Sheet

POROUS METAL-OXIDE THIN FILM AND METHOD OF FORMING SAME ON GLASS SUBSTRATE

BACKGROUND OF THE INVENTION

The present invention relates to a porous metal-oxide thin film, and a method of forming the film on a glass substrate. The film-forming method belongs to the sol-gel process.

It is known that a porous metal-oxide thin film on a glass substrate is effective in reducing refractive index and thus in providing a low-reflectance glass plate. A porous metal-oxide thin film has a very large surface area, due to its porosity. Therefore, when it is used as a sub-layer of a multilayered film, the contact area between the sub-layer and another layer on the sub-layer becomes very large, and thus adhesion therebetween is much improved. With this, the multilayered film becomes much improved in abrasion resistance and durability.

There is known a method for preparing a porous glass such as Vycor (a trade name of Corning Co.) by phase separation. In this method, a sodium borosilicate glass is separated into an acid-soluble phase rich in $Na_2O.B_2O_3$ and an acid-insoluble phase rich in $SiO_2$, and then the acid-soluble phase is removed by an acid. With this, a porous silica glass is formed. However, when this method is used for forming a porous glass film, the film thickness tends to become too thick.

Furthermore, there is known a method for forming a porous metal-oxide film on a glass substrate, by etching. In this method, at first, a metal oxide film is formed on a glass substrate. Then, the surface of the metal oxide film is etched by hydrofluoric acid, fluorine nitrate or the like, to make the surface porous. However, hydrofluoric acid and fluorine nitrate are very hazardous against human body. Therefore, these compounds must be handled very cautiously. This lowers the production efficiency. Furthermore, the etching step increases the production cost.

There is known another method for forming a porous metal-oxide film on a glass substrate. In this method, at first, an organic polymer is added to a metal alkoxide solution (sol), to prepare a coating solution. Then, a glass substrate is coated with the coating solution. Then, the thus coated glass substrate is heated at a temperature not lower than the thermal decomposition temperature of the organic polymer, to remove the organic polymer and thus to make the metal-oxide film porous. However, during this heating, the metal oxide film may contract very much. This leads to the occurrence of cracks thereon. In order to prevent this, the amount of the organic polymer may be reduced. However, as the amount is reduced, micro-pores (micro-pits) making the film porous tend to disappear during the contraction (densification) of the film. With this, the surface of the metal oxide film may not become porous.

There is still another method for forming a porous metal-oxide film on a glass substrate, which is disclosed in U.S. Pat. No. 5,403,368 corresponding to Japanese Patent Kokai Hei 5-147976. This method belongs to the sol-gel process. In this method, at first, a coating solution is prepared by mixing at least two sols having different average molecular weights with a solvent. Then, a glass substrate is coated with the coating solution, so as to form thereon a sol film. Then, the thus coated glass substrate is heated, so as to transform the sol film to a porous gel film then to a porous metal-oxide film. However, according to this method, it is necessary to use certain special starting materials. Furthermore, from a standpoint of pot life of the sols, it may not necessarily easy to produce porous metal-oxide films having the same surface morphology.

SUMMARY OF THE INVENTION

It is therefore an object of the present invention to provide a porous metal-oxide film which is free from cracks, sufficiently hard and superior in adhesion and weatherability.

It is another object of the present invention to provide a method for easily and assuredly forming such porous metal-oxide film.

According to the present invention, there is provided a method of forming on a glass substrate a porous metal-oxide film, the method comprising the steps of:

(a) mixing together at least one compound selected from the group consisting of metal alkoxides and metal acetylacetonates, a first solvent, water, an acid and an organic polymer, so that a hydrolysis and polycondensation of said at least one compound occurs in the presence of said organic polymer and thus that a coating solution in the form of sol having a single phase is prepared;

(b) applying said coating solution to said glass substrate, so that a gel film is formed on said glass substrate, said gel film having inorganic and organic-polymer phases into which said single phase has been separated due to an evaporation of said first solvent;

(c) drying said gel film at a first temperature so as to substantially completely evaporate said first solvent;

(d) removing said organic polymer phase from said gel film, by contacting said gel film with a second solvent which is one of an acid solution and a mixed solution of alcohol and water; and (e) heating said gel film at a second temperature so as to thermally decompose said organic-polymer phase still remained in said gel film and so as to transform said gel film into said porous metal-oxide film.

According to the above-mentioned conventional method, an organic polymer added to a coating solution is removed from a film only by thermally decomposing the organic polymer. In contrast to this, according to the present invention, the organic-polymer phase is removed firstly by contacting the gel film with the second solvent and then by thermally decomposing the organic polymer. During and after this decomposition, micro-pits (micro-pores) and micro roughness making the film porous do not disappear. Therefore, according to the invention, the metal oxide film surface is minutely rough and has a fine features pattern of three-dimensional micro-porous structure. This fine features pattern is relatively orderly distributed on the metal oxide film surface.

In the invention, the organic polymer in the coating solution is chemically bonded to a part of a network of colloidal particles of the at least one compound through esterification. However, the organic polymer itself is soluble in the second solvent and therefore is dissolved by the second solvent.

According to the present invention, the metal-oxide film becomes porous even when the film has a thickness of about 500 nm. The porous metal-oxide film of the present invention is superior in durability, abrasion resistance and adhesion to the glass substrate. The porous metal-oxide film can be used as a single layer film, a multilayer film or a sub-layer of a multilayer film.

DESCRIPTION OF THE PREFERRED EMBODIMENTS

Figure 1:
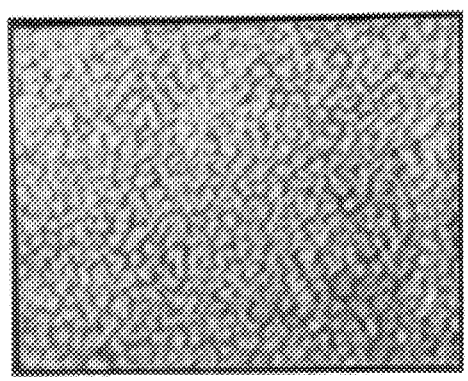
FIGS. 1, 2, 3, 4 and 5 are photographs taken through a scanning electron microscope (SEM) of about 20,000 magnifications, showing porous surfaces of metal-oxide films of Examples 2, 5 and 6 according to the present invention and of Comparative Examples 4 and 6 not according to the present invention, respectively.
Figure 2:
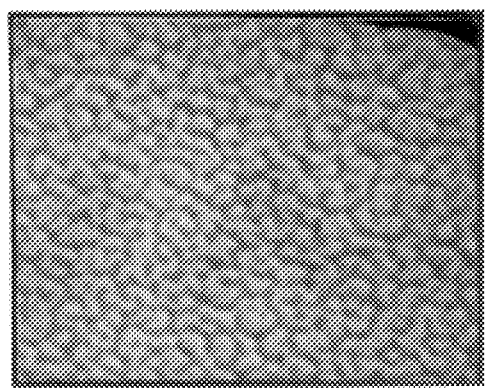
Figure 3:
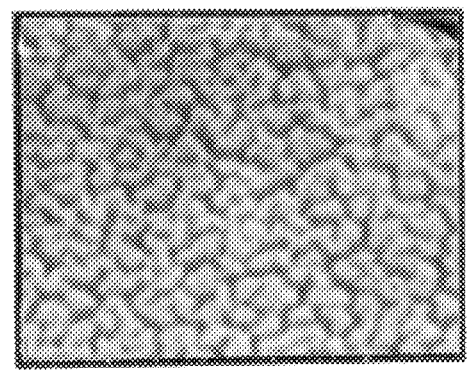
Figure 4:
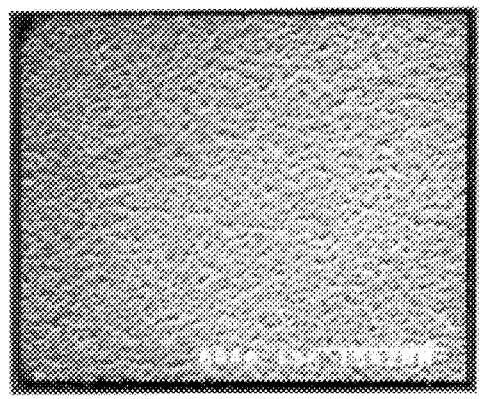
Figure 5:
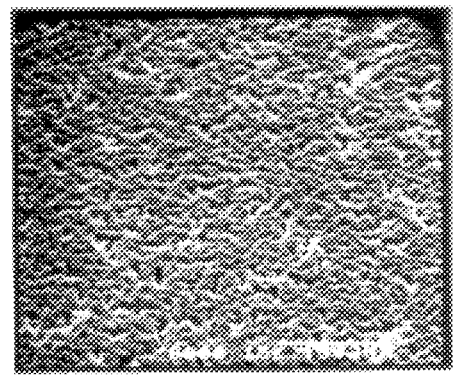

According to the present invention, there is provided a porous metal-oxide thin film, and a method of forming the film on a glass substrate. This method includes the steps of:

(a) mixing together at least one compound selected from the group consisting of metal alkoxides and metal acetylacetonates, a first solvent, water, an acid and an organic polymer, so that a hydrolysis and polycondensation of the at least one compound occurs in the presence of the organic polymer and thus that a coating solution in the form of sol having a single phase is prepared;

(b) applying the coating solution to the glass substrate, so that a gel film is formed on the glass substrate, the gel film having inorganic and organic-polymer phases into which the single phase has been separated due to an evaporation of the first solvent;

(c) drying the gel film at a first temperature so as to substantially completely evaporate the first solvent;

(d) removing the organic polymer phase from the gel film, by contacting the gel film with a second solvent which is one of an acid solution and a mixed solution of alcohol and water; and (e) heating the gel film at a second temperature so as to thermally decompose the organic-polymer phase still remained in the gel film and so as to transform the gel film into the porous metal-oxide film.

In the invention, the glass substrate is not limited to a particular type. This glass substrate may be made of a commercial soda lime glass. This glass substrate may be colorless or colored as long as it is transparent. The glass substrate may be flat or curved in shape, or a tempered one. The glass substrate may be a laminated glass plate or a glass plate for mirror. A glass plate having the metal-oxide film formed on the glass substrate may be used as a low reflection glass plate, a water-repellent glass plate, or another functional glass plate, for example, for cutting ultraviolet rays or infrared rays.

In the invention, examples of the metal alkoxides are tetramethoxysilane, tetraethoxysilane, methyltrimethoxysilane, methyltriethoxysilane, titanium tetraisopropoxide, and zirconium n-butoxide.

In the invention, an example of the metal acetylacetonates is titanium acetylacetonate.

Examples of the first solvent are methanol, ethanol, n-propanol, isopropanol, butanol and ethyl ether. It is preferable to use the solvent having a higher vapor pressure. The solvent of this type evaporates faster.

The solid matter concentration in the coating solution is preferably within a range, on an oxide basis, from 0.01 to 0.50 wt % and more preferably from 0.08 to 0.25 wt %. If the concentration is less than 0.01 wt %, it may become difficult to form a film on a glass substrate. If the concentration is more than 0.50 wt %, it may become necessary to take the heating steps several times in order to prevent the occurrence of cracks.

The amount of water contained in the coating solution is preferably within a range from 4 to 10 mol to 1 mol of the at least one compound selected from metal alkoxides and metal acetylacetonates. If the amount of water is less than 4 mol, it may take a very long time to dissolve the organic polymer or may fail to completely dissolve the organic polymer. If the amount of water is more than 10 mol, the degree of gelation of the coating solution may proceeds too much. With this, the coating solution may not be used for a long time.

The pH of the coating solution is adjusted preferably within a range from 1 to 3 and more preferably from 2 to 3, by the addition of an acid to the coating solution. The amount of this acid is not constant, but varies depending on its type. If the pH is lower than 1, the polycondensation of the metal alkoxide solution proceeds very fast and the solubility of the organic polymer becomes small. If the pH is higher than 3, the polycondensation of the metal alkoxide solution proceeds very slow. Thus, it takes a very long time to prepare the coating solution.

In the invention, the organic polymer is not limited to a particular one, as long as it dissolves in water or a mixed solvent of water and an alcohol and becomes uniformly mixed with the at least one compound in the coating solution. It is preferable that the organic polymer has a carbonyl group. Preferable examples of the organic polymer are polyvinyl acetate, polymethyl methacrylate and polyacrylic acid. It is preferable that the amount of the organic polymer is within a range from 5 to 30 wt % and preferably from 10 to 25 wt %, based on the total weight of the coating solution. If it is less than 5 wt %, the metal oxide film may not necessarily become desirably porous. If it is more than 30 wt %, the residue of the organic polymer may remain in the metal oxide film or it rnay become difficult to obtain a sufficient strength of the metal oxide. In the invention, the organic polymer having a molecular weight within a range from several hundreds to several hundreds of thousands is usable. Its preferable range is from about 50,000 to about 100,000.

The hydrolysis and polycondensation of the at least one compound in the presence of the solvent can be controlled by selecting the type and amount of the acid as a catalyst, the pH of the coating solution, and the reaction temperature (preferably from 20° to 40° C.). This selection may vary depending on the condition of the organic polymer at room temperature (i.e. if the organic polymer takes liquid form or solid form) and/or the type of the at least one compound. It is preferable that the at least one compound is added to the solution in which the organic polymer has already dissolved in the solvent.

The surface morphology of the metal oxide film and the diameter of the micro-pits can be controlled by selecting the amount of the organic polymer and the type of the second solvent for removing the organic polymer.

It is preferable that the drying temperature at the step (c) is lower than 100° C. and more preferably within a range from about 40° to about 90° C. If this temperature exceeds 100° C., the inorganic elements contained in the sol are concentrated as the solvent evaporates. Thus, the film structure becomes gradually rigid or hard. With this, the efficiency for removing the organic polymer may be lowered, resulting in the occurrence of cracks in the metal oxide film.

The heating temperature at the step (e) is preferably a temperature at which the glass substrate is not damaged, at which the porous morphology of the metal oxide film does not disappear, at which the metal oxide film is sufficiently improved in hardness, and at which the organic polymer remained in the film is completely removed. Thus, the heating temperature is preferably higher than the decomposition (combustion) temperature of the organic polymer by at least about 100° C. It is more preferably within a range from about 550° to 690° C., within which the heating step can be conducted while the bending process or the tempering process is conducted on the glass plate. It is still more preferably within a range from about 570° to 670° C.

The porous metal oxide film formed on the glass substrate according to the invention does not have defects such as cracks and the like nor damage the glass substrate in optical characteristics, and is sufficient in mechanical strength and superior in adhesion to the glass substrate, abrasion resistance and durability.

The porous morphology (i.e. the minute roughness and the presence of micro-pores) of the metal oxide film is formed by the phase separation immediately after the gelation of the film applied to the glass substrate, and then by the removal of the organic polymer phase with the second solvent. This removal occurs because the organic polymer dissolves in the second solvent by a certain degree. The micro-pores do not disappear even after the heating at the step (e).

According to the present invention, the organic polymer remained in the film is removed by decomposition (combustion) thereof. Furthermore, at the step (d), it is possible to remove not only the high-polymer phase but also a portion of the inorganic phase. The porous morphology formed by the step (d) does not substantially change by the step (e). Furthermore, compressive stress caused by the heating step (e) is diminished, because the film has a so-called soft structure formed by removing the polymer phase at the step (d). With this, it becomes possible to suppress the occurrence of cracks. Thus, it is possible to add a relatively large amount of the organic polymer to the coating solution.

As is mentioned hereinabove, the organic polymer is soluble in water or a solvent mixture of water and an alcohol. The inorganic structure in the gel film after the drying is not so developed. In the invention, the sol is prepared in the presence of the organic polymer, and thus the polycondensation (the development of the inorganic structure) does not proceed so much, as compared with a case in which a sol is prepared not in the presence of the organic polymer. Therefore, it becomes possible to remove the organic polymer phase and a portion of the inorganic phase.

In the invention, the porous metal-oxide film is almost free of the organic polymer and its residue and free of cracks even when the film thickness is within a range from 500 to 630 nm.

The following nonlimitative Examples 1 to 6 are in accordance with the present invention, and the following Comparative Examples 1 to 6 are not in accordance with the present invention.

Example 1

In this example, a coating solution was prepared as follows. At first, 10 parts by mol of a special-grade ethyl alcohol made by Pharmco Co. was mixed with 8 parts by mol of water containing about 0.05 mol % of HCl so as to prepare a first mixed solution. Then, about 10 wt %, based on the total weight of the coating solution, of a polyvinyl acetate (PVAc) in the form of granule which has an average molecular weight of about 83,000 and is made of Aldrich Co. was completely dissolved in the first mixed solution at room temperature so as to prepare a second mixed solution. Then, 1 part by mol of a tetraethylorthosilicate (TEOS) made by Aldrich Co. was added to the second mixed solution, followed by stirring at room temperature for about 24 hr, so as to prepare the coating solution. This coating solution (sol) had a pH of about 2.0 and a viscosity of about 15 cP.

Separately, a slide glass plate made by Corning Co. and having a product No. of 2947, a size of about 3 inch×about 3 inch and a thickness of about 1 mm was washed with a neutral detergent, then with water and then with alcohol, then dried, and then wiped with acetone. Then, this slide glass plate was immersed into the above-prepared coating solution, and then withdrawn therefrom at a rate within a range from 2 to 5 mm/sec, so as to prepare a gel film on the slide glass plate. Then, the slide glass plate having thereon a gel film was dried at about 80° C. for about 10 min. Then, this slide glass plate was immersed in a mixed solvent containing 1 part by volume of ethyl alcohol and 1 part by volume of water for about 5 min. Then, this slide glass plate was withdrawn therefrom and dried again at about 80° C. for about 10 min. Then, the slide glass plate was heated in an electric furnace for about 30 min with a temperature increasing rate of about 10° C./min, so as to obtain a $SiO_2$-film-coated slide glass plate.

The $SiO_2$ film on the slide glass plate was evaluated by the following tests. The film thickness was optically determined with a spectrophotometer (Lambda 9 UV-VIS-NIR made by Perkin Elmer Co.). The surface condition was observed with a SEM (Amray, 1400, Bedford, Mass.) with magnifications of 20,000 and 30,000 and acceleration voltages of 30 Kv and 15 Kv. In this observation, the surface of the $SiO_2$ film was examined whether or not defects such as cracks are formed on the surface. The average diameter of micro-pores was determined by a N2-gas adsorption and desorption method with Omnisorp 360 (trade name) made by Omicron Technology Co., Berkley Heights, N.J., and a degassing at 150° C. for 24 hr under vacuum condition. The results are shown in Table. Vickers hardness of the $SiO_2$ film was determined with Zwick 3212.00 tester with an impact speed of 0.3 mm/sec, an indent time of 15.0 sec and a load of 0.2 kg, and the result was about 8 kg/mm. The $SiO_2$ film was superior in adhesion, abrasion resistance and durability.

By the above tests, it was found that the $SiO_2$ film surface is minutely rough and has a fine features pattern of three-dimensional micro-porous structure. This fine features pattern was relatively orderly distributed on the $SiO_2$ film surface.

Example 2

In this example, Example 1 was repeated except in that the amount of the PVAc was increased to about 20 wt % based on the total weight of the coating solution. The coating solution had a viscosity of about 35 cP and a pH of about 2.0. The test results are shown in Table. The $SiO_2$ film had the fine features pattern as described in Example 1, and was superior in adhesion, abrasion resistance and durability.

Example 3

In this example, Example 1 was repeated except in that the amount of the PVAc was increased to about 25 wt % based on the total weight of the coating solution. The coating solution had a viscosity of about 50 cP and a pH of about 2.0. The test results are shown in Table. The $SiO_2$ film had the fine features pattern as described in Example 1, and was superior in adhesion, abrasion resistance and durability.

Example 4

In this example, Example 1 was repeated except in that the slide glass plate coated with the dried gel film was immersed for about 5 min in a nitric-acid aqueous solution containing about 0.01 mol % of nitric acid, in place of the mixed solvent of ethyl alcohol and water. The coating solution had a viscosity of about 15 cP and a pH of about 2.0. The test results are shown in Table. The SiO$_2$ film had the fine features pattern as described in Example 1, and was superior in adhesion, abrasion resistance and durability.

Example 5

In this example, Example 2 was repeated except in that the amount of the PVAc was increased to about 20 wt % based on the total weight of the coating solution. The coating solution had a viscosity of about 35 cP and a pH of about 2.0. The test results are shown in Table. The SiO$_2$ film had the fine features pattern as described in Example 1, and was superior in adhesion, abrasion resistance and durability.

Example 6

In this example, Example 2 was repeated except in that the amount of the PVAc was increased to about 25 wt % based on the total weight of the coating solution. The coating solution had a viscosity of about 50 cP and a pH of about 2.0. The test results are shown in Table. The SiO$_2$ film had the fine features pattern as described in Example 1, and was superior in adhesion, abrasion resistance and durability.

Comparative Examples 1–3

In these comparative examples, Examples 1–3 were respectively repeated except in that the first and second drying processes and the immersion process for removing the polymer phase were omitted. In fact, the coated slide glass plate was heated at about 600° C. for about 30 min with a temperature increasing rate of about 2° C./min. The test results are shown in Table. In each of these comparative examples, the SiO$_2$ film had many fine cracks, was in a condition that determination of the micro-pore diameter is impossible, and did not have the fine features pattern as found in Examples 1–6.

Comparative Examples 4

In this comparative example, Example 1 was repeated except in that the immersion process for removing the polymer phase was omitted and that the coating solution was prepared as follows.

At first, a first solution was prepared by mixing together 40 ml of TEOS made by Aldrich Co., 40 ml of ethanol made by Pharmco Co., and 15 ml of water containing 0.1 mol % of HCl, followed by a further mixing through reflux at about 60° C. for about 7 hr.

Separately, a second solution was prepared by mixing together 40 ml of methyltrimethoxysilane made by Aldrich Co., 40 ml of ethanol made by Pharmco Co. and 15 ml of water containing about 0.1 mol % of HCl, followed by a further mixing through reflux at room temperature for about 7 hr.

The first and second solutions were mixed together in a volumetric ratio of 3.5 to 1.5, and then this mixture was stirred at room temperature for not less than about 24 hr, so as to prepare the coating solution. The coating solution had a viscosity of about 3 cP and a pH of about 4.0. The SiO$_2$ film did not have the fine features pattern as found in. Examples 1–6.

Comparative Examples 5

In this comparative example, Example 1 was repeated except in that the immersion process for removing the polymer phase was omitted and that the coating solution was prepared as follows.

At first, 1 part by mol of TEOS made by Aldrich Co. was mixed with 2 part by mol of ethanol made by Pharmco Co. so as to prepare a first solution. Separately, a polyethylene glycol (PEG) in an amount to have a molar ratio of PEG to TEOS of 0.25:1 on a monomer (—CH$_2$CH$_2$O—) basis was mixed with hot water, so as to prepare a second solution. This PEG had a molecular weight within a range from 570 to 630 and an average molecular weight of 600, and was made by Aldrich Co. The first and second solutions were mixed together, and then sufficiently stirred at room temperature in the air for at least about 24 hr, so as to prepare the coating solution. The coating solution had a viscosity of about 10 cP and a pH of about 1.5. The SiO$_2$ film did not have the fine features pattern as found in Examples 1–6.

Comparative Examples 6

In this comparative example, Comparative Example 5 was repeated except in that the PEG was in an amount to have a molar ratio of PEG to TEOS of 0.5:1 on a monomer (—CH$_2$CH$_2$O—) basis. The coating solution had a viscosity of about 18 cP and a pH of about 1.5. The SiO$_2$ film did not have the fine features pattern as found in Examples 1–6.

TABLE

|  | Film Thickness (nm) | Occurrence of Cracks | Average Pore Diameter (nm) |
| --- | --- | --- | --- |
| Example 1 | 250 | no cracks | 30 |
| Example 2 | 260 | no cracks | 80 |
| Example 3 | 240 | no cracks | 100 |
| Example 4 | 230 | no cracks | 60 |
| Example 5 | 260 | no cracks | 100 |
| Example 6 | 235 | no cracks | 130 |
| Com. Ex. 1 | 250 | a large number of fine cracks | N/A |
| Com. Ex. 2 | 240 | a large number of fine cracks | N/A |
| Com. Ex. 3 | 270 | a large number of fine cracks | N/A |
| Com. Ex. 4 | 200 | no cracks | 15 |
| Com. Ex. 5 | 240 | no cracks | 25 |
| Com. Ex. 6 | 260 | a few cracks | 40 |

What is claimed is:

1. A method of forming on a glass substrate a porous metal-oxide film, the method comprising the steps of:
   (a) mixing together at least one compound selected from the group consisting of metal alkoxides and metal acetylacetonates, a first solvent, water, an acid and an organic polymer, so that a hydrolysis and polycondensation of said at least one compound occurs in the presence of said organic polymer and thus that a coating solution in the form of sol having a single phase is prepared;
   (b) applying said coating solution to said glass substrate, so that a gel film is formed on said glass substrate, said gel film having inorganic and organic-polymer phases into which said single phase has been separated due to an evaporation of said first solvent;
   (c) drying said gel film at a first temperature so as to substantially completely evaporate said first solvent;
   (d) removing said organic polymer phase from said gel film, by contacting said gel film with a second solvent which is one of an acid solution and a mixed solution of alcohol and water; and
   (e) heating said gel film at a second temperature so as to thermally decompose said organic-polymer phase still remained in said gel film and so as to transform said gel film into said porous metal-oxide film.

2. A method of forming on a glass substrate a porous metal-oxide film, the method comprising the steps of:

(a) preparing a coating solution which is in the form of sol and has a solid matter concentration within a range from 0.01–0.50 wt % based on the total weight of said coating solution, by mixing together at least one compound selected from the group consisting of metal alkoxides and metal acetylacetonates, a first solvent, 4–10 mols of water to 1 mol of said at least one compound, an acid in an amount to adjust said coating solution to a pH within a range from 1 to 3, and 5–30 wt %, based on the total weight of said coating solution, of an organic polymer, so that a hydrolysis and polycondensation of said at least one compound occurs in the presence of said organic polymer;

(b) applying said coating solution to said glass substrate, so that a gel film is formed on said glass substrate, said gel film having inorganic and organic-polymer phases into which said single phase has been separated due to an evaporation of said first solvent;

(c) drying said gel film at a first temperature not higher than 100° C., so as to substantially completely evaporate said first solvent;

(d) removing said organic-polymer phase from said gel film, by contacting said gel film with a second solvent which is one of an acid and a mixed solution of alcohol and water; and (e) heating said gel film at a second temperature so as to thermally decompose said organic-polymer phase still remained in said gel film and so as to transform said gel film into said porous metal-oxide film.

3. A method according to claim 2, wherein a surface morphology of said porous metal-oxide film is controlled by selecting said organic polymer, by adjusting the molecular weight of and/or the amount of said organic polymer, and/or by selecting said second solvent.

4. A method according to claim 2, wherein said organic polymer has a carbonyl group and thus is soluble in water or a mixed solvent of water and alcohol.

5. A method according to claim 2, wherein said first solvent is selected from the group consisting of alcohols and ethers.

6. A method according to claim 2, wherein said acid is selected from the group consisting of acetic acid, hydrochloric acid and nitric acid.

7. A method according to claim 2, wherein said second temperature is within a range from 550° to 690° C.

* * * * *